(Model.)
T. H. CHUBB.
FERRULE FOR FISHING RODS.
No. 264,243. Patented Sept. 12, 1882.
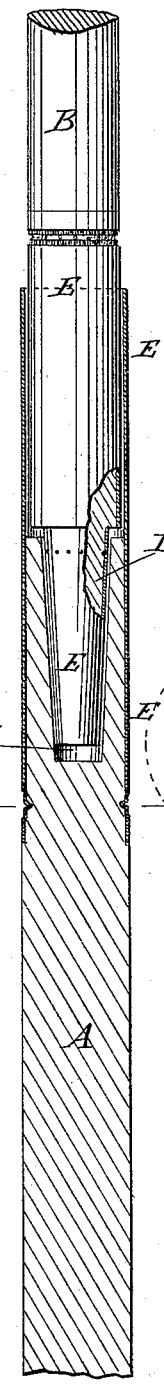
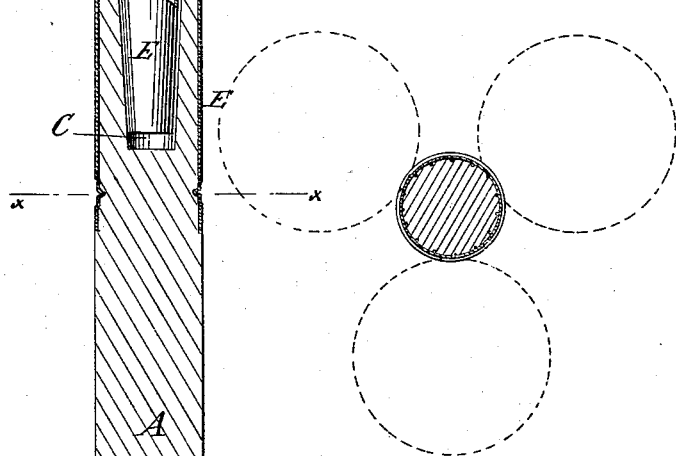
WITNESSES:
Chas. Nida
C. Sedgwick
INVENTOR:
T. H. Chubb
BY Munn & Co
ATTORNEYS.

UNITED STATES PATENT OFFICE.

THOMAS H. CHUBB, OF POST MILLS, VERMONT.

FERRULE FOR FISHING-RODS.

SPECIFICATION forming part of Letters Patent No. 264,243, dated September 12, 1882.

Application filed May 24, 1882. (Model.)

*To all whom it may concern:*

Be it known that I, THOMAS H. CHUBB, of Post Mills, in the county of Orange and State of Vermont, have invented a new and useful Improvement in Ferrules for Fishing-Rods, of which the following is a full, clear, and exact description.

Reference is to be had to the accompanying drawings, forming part of this specification, in which similar letters of reference indicate corresponding parts in all the figures.

Figure 1 is a sectional side elevation of my improvement shown as applied to a fishing-rod. Fig. 2 is a side elevation of the same. Fig. 3 is a sectional plan view of the same, taken through the line $x\ x$, Fig. 1.

The object of this invention is to promote reliability in securing ferrules—such as the ferrules of fishing-rods—in place.

The invention consists in securing ferrules in place by forming an annular groove in the ferrule after it has been arranged in place, indenting the ferrule in the bottom of the groove, and then milling the surface of the groove, as will be hereinafter fully described.

I will describe my improvement as applied to fishing-rod ferrules, but do not limit myself to that application, as it can be used with advantage upon ferrules placed upon various other articles or sticks.

A B represent the adjacent lengths of a fishing-rod. In the end of the length A is formed a tapering hole, C, to receive the tapering dowel or tenon D, formed upon the end of the length B. Upon the ends of the lengths A B are placed ferrules E, the one upon the length B being so formed as to fit upon the dowel D, and thus strengthen the dowel. As thus far described, there is nothing new in the construction. After the ferrule has been placed upon the stick an annular groove is formed around it at a little distance from the end, pressing the metal of the ferrule into the wood, thus compressing and hardening the ring of wood beneath the groove in the ferrule. The ferrule is then indented or punctured in the bottom of its groove, forming points or burrs, which are pressed into the wood in the hardened ring, whereby the ferrule is more firmly secured than if the wood were not compressed. The surface of the groove is thus milled, as shown in Fig. 2. With this construction the ferrules will not be liable to come off, as the groove prevents them from being drawn off, the indentations prevent them from turning, and also assist in preventing them from being drawn off, and the milling gives a finish to the ferrules.

The grooving, indenting, and milling are designed to be done in a machine successively, but at one operation, by suitably-formed tools, as indicated in dotted lines in Fig. 3.

I am aware that ferrules have before been secured to sticks by means of annular grooves, and by means of single indentations made here and there without method, and that ferrules have been ornamented with milled rings, and I do not claim either of these alone or broadly as my invention.

Having thus fully described my invention, what I claim as new, and desire to secure by Letters Patent, is—

The combination, with a stick, of a ferrule, E, having an annular groove formed in it by pressing the metal into the wood, and having indentations formed in it at the bottom of its groove, substantially as herein shown and described, whereby the said ferrule will be held securely in place, as set forth.

THOMAS HENRY CHUBB.

Witnesses:
WM. B. CHUBB,
CHAS. A. POWELL.